United States Patent [19]

Rathjen, Jr.

[11] 4,128,754

[45] Dec. 5, 1978

[54] ARC SPRAY WELDING REPLACEABLE ELECTRODE TIP

[75] Inventor: Edwin H. Rathjen, Jr., Cambridge, Ill.

[73] Assignee: The United States of America as represented by the Secretary of the Army, Washington, D.C.

[21] Appl. No.: 883,968

[22] Filed: Mar. 6, 1978

[51] Int. Cl.² .............................................. B23K 9/12
[52] U.S. Cl. .............................. 219/137 R; 219/76.1; 219/137.44; 219/137.61
[58] Field of Search ............... 219/137.44, 136, 137.61, 219/137.63, 76.1

[56] References Cited

U.S. PATENT DOCUMENTS

| | | | |
|---|---|---|---|
| 3,546,415 | 12/1970 | Marantz | 219/136 |
| 3,639,720 | 2/1972 | Malivoir | 219/136 |

*Primary Examiner*—J. V. Truhe
*Assistant Examiner*—Clifford C. Shaw
*Attorney, Agent, or Firm*—Nathan Edelberg; Robert O. Richardson

[57] ABSTRACT

Method and article of manufacture for replacing arc spray welding electrode tips which are subject to excessive wear due to heat and friction. In one form this consists of providing an elongated holder for receiving a threaded tip portion and in another form this consists of cutting off and threading a portion of the holder, and interconnecting the threaded tip portion to the holder with an intermediate coupling gas diffuser.

6 Claims, 4 Drawing Figures

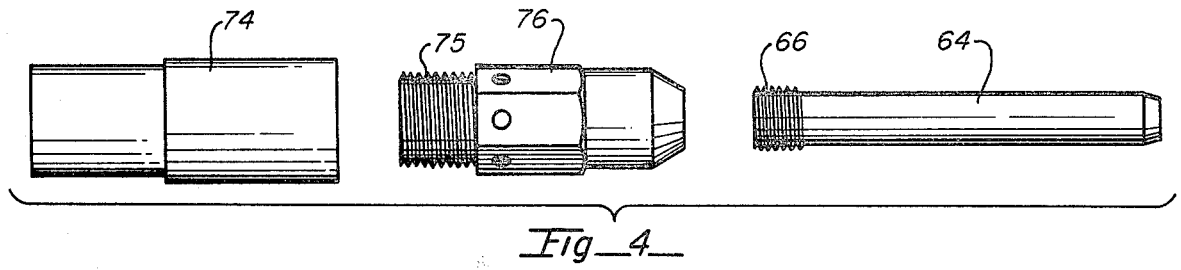
Fig_4_
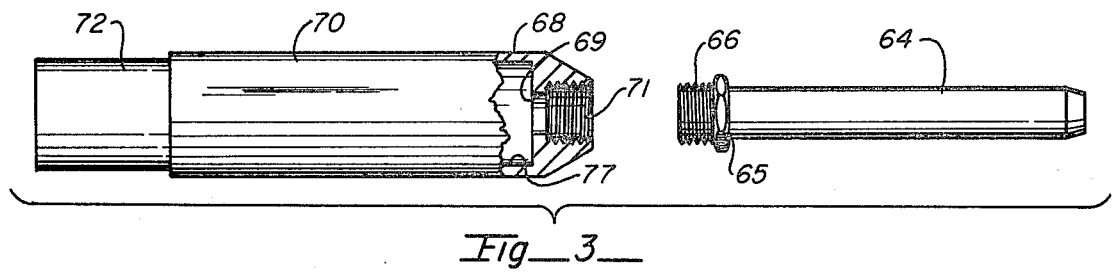
Fig_3_
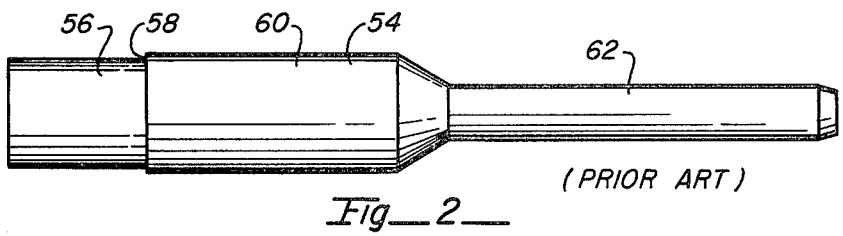
(PRIOR ART)
Fig_2_
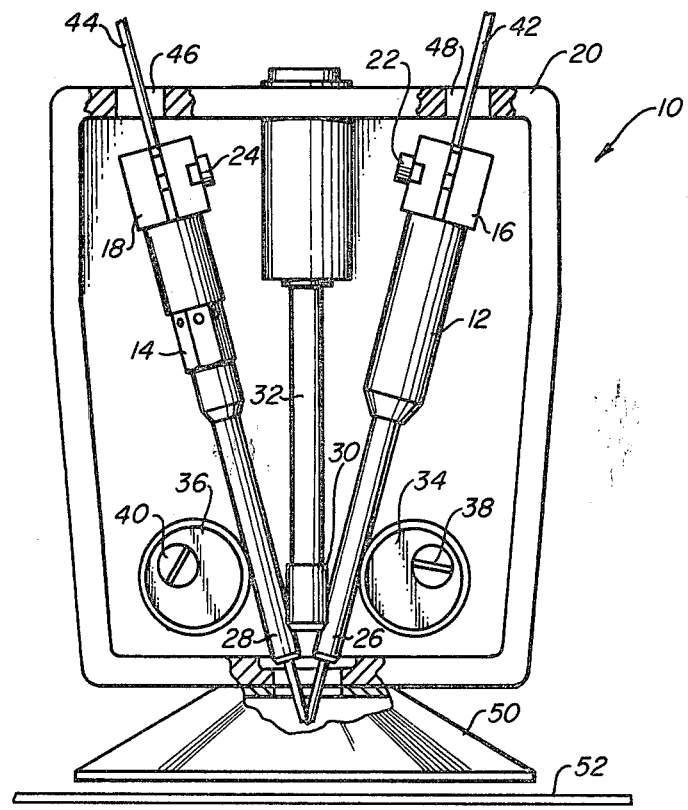
Fig_1_

ARC SPRAY WELDING REPLACEABLE ELECTRODE TIP

GOVERNMENT RIGHTS

The invention described herein may be manufactured and/or used by or for the Government for governmental purposes without the payment of any royalty thereon.

BACKGROUND OF THE INVENTION

The present invention relates to replaceable electrodes for arc spray welding guns. Arc spray welding guns are used to deposit a metal coating on areas of high wear, such as bearing surfaces. The electrodes of the arc spray welding guns are subject to excessive wear due to heat and friction. They carry a large electrical current which is induced in a pair of metalizing wires. The electrodes are substantially tubular and serve as a guide to accurately position the wires. Two electrodes are arranged in a "V" pattern and are separated by a compressed air nozzle in the arc spray gun. The metalizing wires automatically advance through the electrodes until they contact each other beneath the air nozzle. When the wires make contact the electrical circuit is completed. This creates an intense heat which liquefies the metalizing wires. At the same time the compressed air forces the molten metal through a horn shaped shield on the bottom of the arc spray gun. This produces a uniform spray of molten globules which is then deposited directly on the surface to be plated.

The tips of the electrodes are exposed to constant high heat and friction from the wires. They are also made of copper so as to be a good electrical conductor. The high heat and friction cause the soft metal electrode tips to wear very quickly. The electrode tips when new have a sliding fit with the metalizing wires within them. As the inner wire guiding portions of the tips wear out-of-round, the wires are no longer accurately positioned. This results in intermittent contact and causes an uneven spray. Because of this, a typical arc spray gun will use ten electrodes in one day of operation. At forty dollars per electrode this understandably runs into considerable expense. The manufacturer offers the electrodes as a unit only. Since only the tip of the electrode wears out, it is very desirable to obtain an electrode with inexpensive replaceable tips.

SUMMARY OF THE PRESENT INVENTION

The object of the present invention is to provide an electrode for use with arc spray guns wherein the electrode has a replaceable and economical tip. This is accomplished by two different methods. The first method utilizes the base end portion of a worn out electrode. It is the base end which fastens the electrode to the spray gun. As previously stated only the tip wears, therefore the base end is salvageable. The base is cut from the worn electrode and tapped internally to accept a commercially available gas diffuser. The gas diffuser is made to accommodate a commercially available electrode tip. The second method utilizes a custom made electrode with the commercially available tip. With either method the tip of the electrode is simply unscrewed and replaced as it wears out. The replaceable tips are priced at about fifty cents. This represents a substantial savings over the replacement cost of the complete electrode. Also, different hole sizes are available in the tips. This allows the electrode to be used with different wire sizes.

BRIEF DESCRIPTION OF DRAWINGS

FIG. 1 is a front elevational view of an arc spray welding gun with the cover removed to show internal structure, FIG. 2 is a front elevational view of a prior art electrode for the arc spray gun, FIG. 3 is an exploded front elevational view of one form of the replaceable tip electrode; and FIG. 4 is an exploded front elevational view of a second form of the replaceable tip electrode.

DETAILED DESCRIPTION OF ILLUSTRATIVE EMBODIMENTS

Reference is made to FIG. 1 wherein there is shown a typical arc spray welding gun 10. As shown, the arc spray gun holds two electrodes 12, 14. The electrodes are retained in the gun by two clamps 16, 18 which extend through the rear of the case 20 to terminals connected to an electric welding machine (not shown). After the electrodes 12, 14 are inserted into the clamps, retaining screws 22, 24 are tightened to secure the electrodes and insure good electrical contact. The tips 26, 28 of the electrodes 12, 14 are positioned against recesses in an insulating cap 30 positioned over the end of air nozzle 32. Eccentrically mounted insulators 34, 36 have a concave circumferential groove (not shown). These insulators are rotated until they bear against the electrode tips 26, 28 and the tips rest in the concave groove. Screws 38, 40 are then tightened to retain the insulators and electrode tips in position.

The electrodes are substantially tubular and have a reduced internal diameter at the tips 26, 28. This reduced diameter is determined by the size of metalizing wires 42, 44 used with the electrodes. There must be a close sliding fit between the wire and the electrode tip to insure accurate positioning of the wires and positive electrical contact between the wires 42, 44 and the electrode tips 26, 28.

The metalizing wires 42, 44 are fed into the arc spray gun 10 through apertures 46, 48 and into the electrodes 12, 14. In operation the wires 42, 44 are automatically advanced until they contact each other below the air nozzle 32. When the wires 42, 44 touch, the electric circuit is completed and the wires are liquefied by the intense heat generated. Air nozzle 32 is connected to a compressed air supply (not shown). The air stream from the nozzle 32 blows the liquefied metal out through spray shield 50 where it is deposited directly on the surface 52 to be plated.

This device is ideally suited for putting bearing surfaces on parts where great structural strength is required. In this manner, the component can be made of a high strength material, such as steel, and have a comparatively thin layer of bearing material sprayed on the surface. One example of where this is used is on a sleeve used in the M140 gun mount. The sleeve is a tubular member which supports the gun tube or barrel. When the weapon is fired the gun tube recoils and must slide through the sleeve. Also the sleeve must withstand the tremendous load generated by the firing. Therefore the sleeve must be very strong but still have adequate bearing surface to support and guide the gun tube. The bearing surface is necessary to prevent galling which is a typical result of two steel surfaces rubbing together. The bearing surface is usually made with brass metalizing wire and built up in several thin layers. Normally the thickness of the bearing is sprayed on thicker than required. The bearing is then machined to the exact size and surface finish required.

FIG. 2 shows the prior art electrode 54 available from the manufacturer as a unit only. Note the base end 56 of the electrode 54 is of a reduced diameter. This results in a shoulder 58 being formed where the base 56 meets the central portion 60 of the electrode 54. This shoulder 58 helps to accurately position the electrode in the arc spray gun. The shoulder 58 abuts the lower surface of clamp 16 or 18 when inserted, thus establishing the longitudinal position of the electrode. As previously stated, the elongated tip portion 62 has a reduced internal diameter, established by the size of metalizing wire being used and ideally has a close sliding fit with the wire. However, after a period of operation, the internal diameter is worn out-of-round. The metalizing wires may then no longer be accurately positioned, resulting in intermittent contact and poor metal spray.

FIG. 3 shows a first embodiment of the replaceable tip electrode. The elongated tip portion 64 has a longitudinal wire guide bore and a tip 64 that is threaded at one end 66. This allows convenient removal and replacement of the tips with tip holder 68. The tip holder 68 is a custom made part also having a wire guide bore 69. Threaded bore 71 is adapted to receive end 66. Note that the central portion 70 of the holder 68 is somewhat longer than the central section 60 on the prior art electrode 54 shown in FIG. 2. This is because the replacement tip 64 is shorter than tip 62 of the prior art electrode 54. The combined length of tip holder 68 and tip 64 when inserted and attached is substantially the same as that of the prior art unit shown in FIG. 2. This is necessary in order to properly position the metalizing wires 42, 44 in FIG. 1 for proper spacing of the arc from workpiece 52. The rotation of tip 64 in a right hand or clockwise direction will shorten the overall length and rotation in a left hand or counterclockwise direction will increase the length. If desired, a lock nut 65 may be inserted onto the threads 66 at the desired length from the other end of tip 64 whereby the nut will abut holder 68 when the tip has been inserted to the proper length. The reduced diameter end 72 of holder 68 is used to mount the electrode in a manner similar to the prior art electrode 54.

FIG. 4 illustrates a second embodiment of the replaceable tip electrode. In this form the base portion 74 can be salvaged from a worn out commercial electrode. Since the base is isolated from the intense heat and is a clearance fit with the metalizing wires, no wear occurs at this end. Therefore, all that is required is to cut the required length from the worn electrode and tap the bore at its cut end to mate with threads 75 on a gas diffuser 76. It has been found that the bore in base portion 70 (bore 77 in FIG. 3) is of ideal diameter for mating with the diffuser. Otherwise, reboring at the correct diameter would be necessary. The gas diffuser 76 is a commercially available part made for use with the replacement tips 64 and is used in gas welding to form a gas shield over the weld area. In the present invention the gas shield feature is not used. Diffuser 76 has a longitudinal bore (not shown) threaded to mate with end 66 of tip 64. This embodiment has the advantage of being able to be made with simple hand tools and commercially available parts.

Here, again, the overall length of base portion 74, gas diffuser coupling 76, and replaceable tip 64, when assembled, is substantially the same length as that of the prior art electrode shown in FIG. 2.

It should be noted that modification of the tip holders as shown in FIGS. 3 and 4 are one time operations and that, thereafter, the worn tips 64 are simply removed and replaced with new ones.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. The method of replacing electrode tips which are subject to excessive heat and wear wherein said tips are integral with electrodes having base ends affixable within and to an arc spray gun and said electrodes including said base ends and said tips are one piece and have a communicating bore within which and through which metalizing wires pass and wherein there is a close sliding fit between said wires and said tips whereby the ends of said wires are positioned for abutting engagement at a fixed predetermined position to complete an electrical circuit for arcing and liquefying of said wire ends by the intense heat thus generated, and an air stream deposits said liquefied metal directly onto a surface to be thus plated, said method comprising the steps of:
   a. obtaining an available tip externally threaded on one end, said tip having a bore of desired diameter,
   b. determining and then fabricating an electrode holder of sufficient length whereby upon insertion of the threaded end of said available tip into said holder, said holder and tip have a combined length substantially equal to the length of the electrode being thus replaced,
   c. providing internal threads in one end of said holder to receive the threaded end of said tip, and
   d. threading said tip into said holder until the desired length is achieved.

2. The method of replacing electrode tips as set forth in claim 1 and,
   e. subsequently removing said tip when worn and replacing said tip with a similar tip not worn.

3. The method of replacing electrode tips as in claim 2 wherein said tips are removed by left-hand or counterclockwise rotation and said tips are replaced with right-hand or clockwise rotation.

4. The method of replacing electrode tips as in claim 1 wherein step b. includes the steps of:
   b.a. obtaining a gas diffuser having external threads at one end and a longitudinal bore with internal threads at the other end engageable with the threads on the end of said available tip and threadedly mating them together,
   b.b. cutting a worn electrode into two sections, discarding the section with the worn tip, and threading that section including the base end internally to receive the external threads on one end of said diffuser, and
   b.c. threadedly connecting said diffuser to said base end, and said available tip to said diffuser by relative rotation until the base end electrode, diffuser and tip have a combined length substantially the same as that of the worn electrode they replace.

5. The method of replacing electrode tips as in claim 4, and
   b.d. thereafter replacing said tips when worn with similar unused tips.

6. In an arc spray welding gun having a pair of electrodes for positioning metalizing wires whereby when the ends of said wires contact each other an arc is made and the abutting ends of said wires liquefy, said electrodes each comprising:

a base portion attached to said gun, a central portion integral with said base portion, said central portion terminating in a threaded bore,
a gas diffuser unit threaded into said bore, and
a threaded tip threaded into said gas diffuser unit,
said base portion, central portion, gas diffuser unit and threaded tip having aligned and cooperating bores whereby metalizing wires may be passed therethrough and guided thereby.

* * * * *

UNITED STATES PATENT OFFICE
CERTIFICATE OF CORRECTION

Patent No. 4,128,754         Dated December 5, 1978

Inventor(s) Edwin H. Rathjen, Jr.

It is certified that error appears in the above-identified patent and that said Letters Patent are hereby corrected as shown below:

Title page, "/73/ Assignee: The United States of America as Represented by the Secretary of the Army, Washington, D. C."

should be deleted.

Signed and Sealed this

Twenty-second Day of May 1979

[SEAL]

Attest:

RUTH C. MASON
Attesting Officer

DONALD W. BANNER
Commissioner of Patents and Trademarks